US006417582B1

(12) United States Patent
Dold et al.

(10) Patent No.: US 6,417,582 B1
(45) Date of Patent: Jul. 9, 2002

(54) SAFETY SWITCHING ARRANGEMENT

(75) Inventors: Franz Josef Dold, Furtwangen (DE); Jens Niehus, Strasbourg (FR)

(73) Assignee: Sick AG, Waldkirch (DE)

(*) Notice: Subject to any disclaimer, the term of this patent is extended or adjusted under 35 U.S.C. 154(b) by 0 days.

(21) Appl. No.: 09/522,637

(22) Filed: Mar. 10, 2000

(30) Foreign Application Priority Data

Mar. 16, 1999 (DE) ........................................ 199 11 698

(51) Int. Cl.[7] ............................ H02H 5/10; H02H 7/26
(52) U.S. Cl. ......................................... 307/326; 361/62
(58) Field of Search ............................... 307/326, 327, 307/116, 125; 361/92, 93, 96, 62; 200/47, 313, 518; 180/63; 318/587

(56) References Cited

U.S. PATENT DOCUMENTS

| | | | | |
|---|---|---|---|---|
| 3,610,951 A | * 10/1971 | Howland | 377/79 |
| 4,462,058 A | * 7/1984 | Ziegler | 361/62 |
| 5,132,867 A | * 7/1992 | Klancher | 361/62 |
| 5,341,130 A | * 8/1994 | Yardley et al. | 340/825.06 |
| 5,973,899 A | * 10/1999 | Williams et al. | 361/72 |

FOREIGN PATENT DOCUMENTS

| | | |
|---|---|---|
| DE | 4104590 A1 | 8/1991 |
| DE | 4104230 A1 | 8/1992 |
| DE | 4447206 A1 | 7/1996 |
| DE | 19532196 A1 | 3/1997 |
| DE | 4306950 C2 | 4/1997 |
| DE | 19734589 A1 | 10/1998 |
| DE | 69319678 T2 | 2/1999 |

OTHER PUBLICATIONS

Starke, L.: "LSN—Ein Lokales Bussystem für Gefahrenmeldeanlagen", in: de 22/94, pp. 1709–1710 No date available.

* cited by examiner

*Primary Examiner*—Rajnikant B. Patel
(74) *Attorney, Agent, or Firm*—Townsend and Townsend and Crew LLP

(57) ABSTRACT

A safety switching arrangement has at least two break switches (12*a*, 12*b*, 12*c*) which are connected in series to an evaluation unit (11), in which case the evaluation unit (11) initiates a safety signal, in particular an alarm signal and/or disconnection signal, when at least one of the break switches (12*a*, 12*b*, 12*c*) opens, and determines which of the break switches (12*a*, 12*b*, 12*c*) has opened. At least one, and preferably all, of the break switches (12*a*, 12*b*, 12*c*) has or have an associated code signal generator (13*a*, 13*b*, 13*c*) which, when the associated break switch (12*a*, 12*b*, 12*c*) opens, supplies to the evaluation unit (11) a code signal which is characteristic of the relevant break switch (12*a*, 12*b*, 12*c*) via a line, in particular a diagnosis line (15) or safety line sections (16*a*, 16*b*, 16*c*), which leads to the evaluation unit (11) and is common to all the break switches (12*a*, 12*b*, 12*c*) associated with a code signal generator (13*a*, 13*b*, 13*c*), which code signal is analyzed in the evaluation unit (11) and is identified as coming from the relevant break switch (12*a*, 12*b*, 12*c*).

14 Claims, 2 Drawing Sheets

SAFETY SWITCHING ARRANGEMENT

BACKGROUND OF THE INVENTION

The invention relates to a safety switching arrangement having at least two break switches connected in series to an evaluation unit which initiates a safety signal when at least one of the break switches opens and determines which of the break switches has opened.

It is already known (W. Gräf, Maschinensicherheit [Machine safety], Hütig-Verlag 1997, pages 108–111) for safety switches to be linked in series in order to protect danger points, in the field of safety technology. This is used, for example, in emergency-off circuits in transfer lines and on conveyor belts. In order to determine the respective location of the tripped safety switch in the event of operation, each safety switch is provided with diagnosis contacts which are operated with the opening of the safety switches and are connected by individual lines to the evaluation unit. However, this known safety switching arrangement requires highly complex wiring due to the requirement for a cable link from each diagnosis contact to the evaluation unit. Installation and commissioning are complex. Numerous PLC (programmable logic control) inputs are required on the evaluation unit.

SUMMARY OF THEN INVENTION

It is an object of the invention to provide a safety switching arrangement of the generic type mentioned above, whose wiring complexity is considerably reduced and which is simple to install and to place in operation.

The idea of the invention is thus that, whenever the break switch opens, a code signal that is characteristic of it is initiated and is supplied to the evaluation unit via a line which is common to all or a plurality of break switches. Consequently, there is no need for the previously required star-configuration wiring for the diagnosis contacts provided on the break switches; this is replaced by serial linking of the diagnosis signals. This avoids additional PLC inputs on the evaluation unit.

The code signal generator associated with each break switch expediently has an associated make switch which is operated jointly with it and activates the associated code signal generator when it closes.

While in one embodiment of the invention the wiring is less complex, another embodiment has the advantage of strict isolation of the diagnosis and safety circuit, leading to simpler evaluation logic in the evaluation unit.

A further option for producing the code sequence and the code signal is for the mechanical force when the safety break switch is operated to be used to produce a short electronic signal. In this case, there is no need for any additional voltage supply or the wiring complexity required for this purpose. All that need be done is for the safety break switch to be appropriately modified.

Thus, when the associated safety break switch is operated, each code signal generator applies a unique code sequence either to the safety path formed by the line sections or to the single diagnosis line provided in addition for this purpose. The safety path (safety line and safety line sections) is closed in the normal, unoperated state.

An ASICS or microprocessor can be programmed with a unique code sequence or a unique code signal, which is emitted when the break switch is operated. One embodiment of the invention uses a special voltage supply which is common to all code signal generators for this purpose. However, this voltage supply may also possibly be obtained from the safety path or the diagnosis line. Furthermore, commercially available safety switches may still be used, which then just need to be equipped with appropriate additional electronics.

The code signal generators preferably have an ASICS or a microprocessor for generating the code signals.

The code signal of the code signal generators may either be applied to the safety or diagnosis line, by the make switches being incorporated in an activation line of the microprocessor and the signal output being continuously connected to the safety or diagnosis line, or by the microprocessor being continuously activated and the make switches being arranged in the signal output.

A test signal for fault identification is expediently output at the test-out connection, and is read back at the test-in connection. If a break switch is operated, the data flow is interrupted. At the same time, the make switch is closed, resulting in the code sequence produced by the associated code signal generator being modulated onto the safety path or the diagnosis line. The test-in or diagnosis-in connection identifies this code sequence and associates this sequence with the corresponding break switch via a connection table which is produced during installation. Each safety switch is given a unique code sequence, which is allocated only once, in the factory.

The invention has the advantage that there is no need for the star-configuration wiring of the diagnosis contacts, and the wiring complexity for the safety path can thus be reduced. Furthermore, no individual diagnosis inputs are required on the evaluation unit. This results in an additional saving in the area of local inputs/outputs. Intelligent controllers and local inputs/outputs already provide for the evaluation of test signals, so that no major additional development complexity is required here.

The invention is not limited to emergency-off switching arrangements but may also be applied to the linking of all safety device outputs having contacts, such as guard gate switches, non-contacting protective devices, position switches, two-hand controllers, etc.

Redundant safety paths are used to comply with relatively stringent safety classes. The circuit need not be expanded for this purpose. Installation and commissioning are simplified by saving wiring and by using existing system configuration aids, such as PC tools.

The invention does not represent a bus system, and thus avoids the following disadvantages which are intrinsic with a bus system:

- addressing of the individual bus subscribers;
- avoidance of data collision by means of complex message procedures;
- use of special ASICS for bus connection.

DESCRIPTION OF THE PREFERRED EMBODIMENTS

Figure 1:
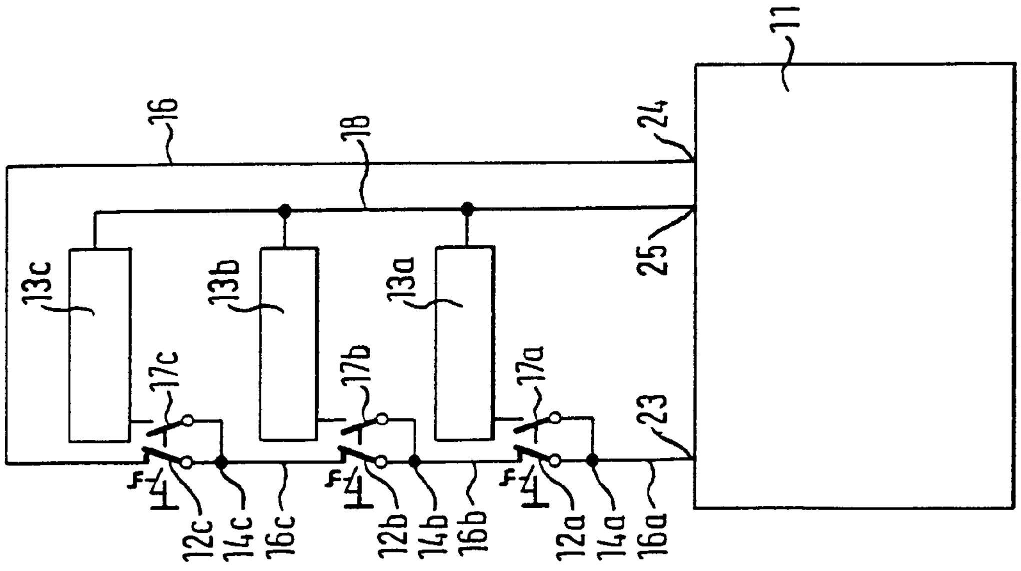
FIG. 1 shows an embodiment of the invention in which there is no special diagnosis line.

According to FIG. 1, an evaluation unit 11 has a test-in connection 23, a test-out connection 24 and a voltage supply connection 25.

The test-in connection 23 leads via a first safety line section 16*a* to a first safety break switch 12*a*, then via a second safety line section 16*b* to a second safety break switch 12*b*, and then, onwards, via a third safety line section 16*c* to a third safety break switch 12*c*, and from there, via a safety line return 16 back to the test-out connection 24. In this way, a safety path 16*a*, 12*a*, 16*b*, 12*b*, 16*c*, 12*c*, 16 is created when the break switches 12*a*, 12*b*, 12*c* are closed, which safety path is normally closed and opens when one of the break switches 12*a*, 12*b*, 12*c* responds, thus signalling to the evaluation unit 11 that there is a fault in the area of the open break switch 12*a*, 12*b* or 12*c*.

Each break switch 12*a*, 12*b*, 12*c* has an associated make switch 17*a*, 17*b*, 17*c*, which closes when the associated break switch 12*a*, 12*b*, 12*c* opens. The make switches 17*a*, 17*b*, 17*c* are connected on the one hand to a code signal generator 13*a*, 13*b*, 13*c*, and on the other hand to the input 14*a*, 14*b*, 14*c* of the associated break switch 12*a*, 12*b*, 12*c*. A voltage supply line 18, which is common to all the code signal generators 13*a*, 13*b*, 13*c* and which is connected to the voltage supply connection 25 of the evaluation unit 11, leads onwards to the code signal generators 13*a*, 13*b*, 13*c*.

The generators 13*a*, 13*b*, 13*c* are designed such that each of them can produce a characteristic code sequence or a code signal which is characteristic of the associated break switch 12*a*, 12*b*, 12*c*, as soon as the associated break switch 12*a*, 12*b*, 12*c* has opened and the associated make switch 17*a*, 17*b*, 17*c* has closed. The code signal passes either via the line section 16*a* or via the line sections 16*a*, 16*b* and the closed break switch 12*a*, or via the line sections 16*a*, 16*b*, 16*c* and the closed break switch 12*a*, 12*b*, to the test-in connection 23 of the evaluation unit 11 where the contents of the individual code signals or code sequences are used to identify which of the break switches 12*a*, 12*b*, 12*c* has responded. The described safety switching arrangement operates as follows:

In the normal, fault-free case, all the break switches 12*a*, 12*b*, 12*c* are closed, so that a closed safety path 16*a*, 12*a*, 16*b*, 12*b*, 16*c*, 12*c*, 16 exists and, in this way, the evaluation unit 11 is signalled via the test-in/test-out connections 23, 24 that no fault is present at any of the monitoring points associated with the break switches 12*a*, 12*b*, 12*c*.

By way of example, as soon as a fault occurs in the area of the break switch 12*b* on a transfer line or a conveyor belt, the break switch 12*b* opens either automatically or by manual operation, thus interrupting the safety path and with a fault being signalled to the evaluation unit 11 via the test-in/test-out connections 23, 24.

Since the make switch 17*b* was closed at the same time, the code signal generator 13*b* passes a code signal that is characteristic of the break switch 12*b* via the line sections 16*a*, 16*b* and the break switch 12*a*, which is still closed, to the test-in input 23, on the basis of which code signal the evaluation unit 11 identifies that, of the three break switches 12*a*, 12*b*, 12*c*, the break switch 12*b* has opened. The fault location is thus identified.

Figure 2:
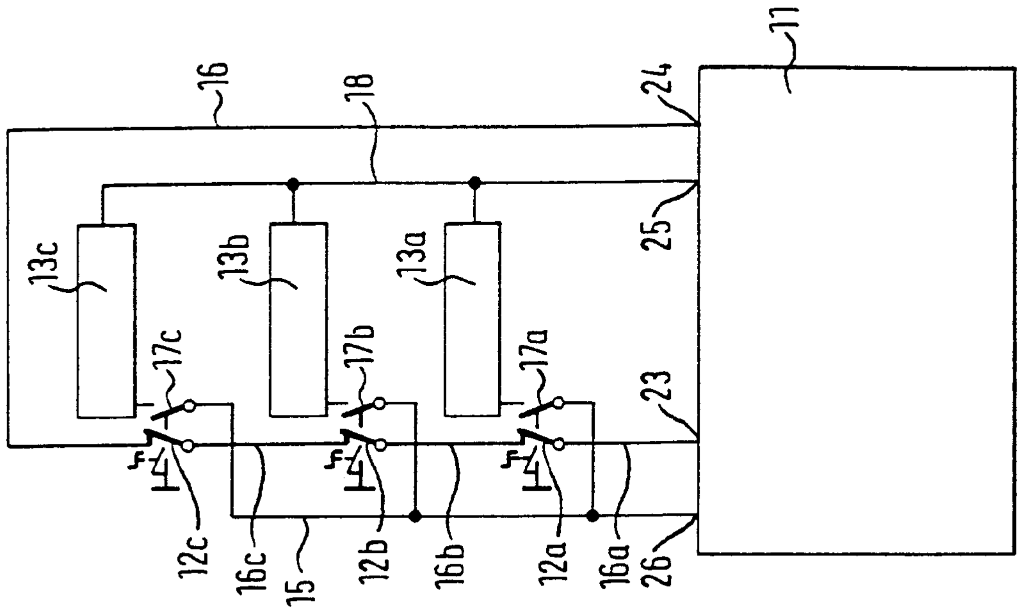
FIG. 2 shows a further embodiment with a special diagnosis line.

The exemplary embodiment according to FIG. 2, in which the same reference numbers denote corresponding components to those in FIG. 1, differs from the embodiment according to FIG. 1 in that the pole of the make switches 14*a*, 14*b*, 14*c* that is averted from the code signal generators 13*a*, 13*b*, 13*c* is connected to a diagnosis line 15, which is common to all the make switches 17*a*, 17*b*, 17*c*, rather than to the inputs 14*a*, 14*b*, 14*c* of the break switches 12*a*, 12*b*, 12*c*, and this diagnosis line 15 is connected to a separate diagnosis-in connection 26 of the evaluation unit 11.

In this way, the general fault signal initiated by the safety path 16*a*, 12*a*, 16*b*, 12*b*, 16*c*, 12*c*, 16 as a result of a break switch 12*a*, 12*b*, 12*c* opening will appear via the test-in connection 23, and the code signal that is characteristic of the open break switch 12*a*, 12*b*, 12*c* will appear at the special diagnosis-in connection 26. In this way, although the wiring complexity is rather greater than in the embodiment according to FIG. 1, the isolation of the diagnosis line and safety path simplifies the evaluation logic in the evaluation unit 11.

Figure 3:
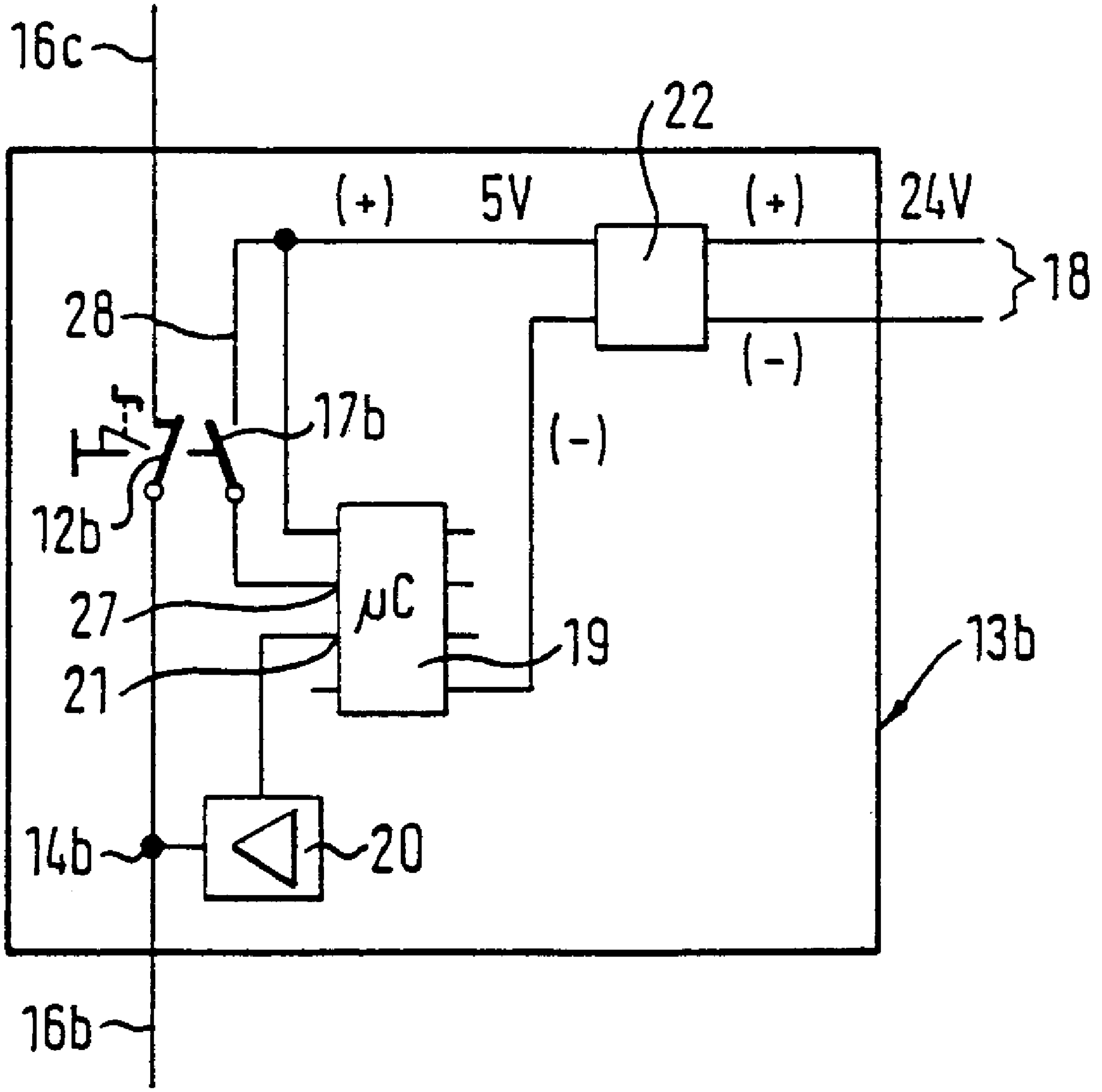
FIG. 3 shows a practical exemplary embodiment of a generator which can be used with the safety switching arrangement according to the invention.

According to FIG. 3, the code signal generators 13*a*, 13*b*, 13*c* may have a microprocessor 19 as a core component. Voltage is supplied to the microprocessor 19 via a voltage converter 22, which is connected to the voltage supply connection 25 of the evaluation unit 11 via the voltage supply line 18. The voltage converter 22 converts the voltage of 24 V that is present at the output 25 of the evaluation unit into, for example, a stabilized voltage of 5 V. The microprocessor 19 is activated by opening of the break switch 12*a*, 12*b*, 12*c* or closing of the associated make switch 17*a*, 17*b*, 17*c*, and it then emits the code signal at its signal output 21 to an amplifier 20, from which it passes to the safety line section 16*b*. The microprocessor 19 is activated by an activation line 28 branching off from the positive supply voltage line (5 V), and leading via the make switch 17*b* to an activation input 27 of the microprocessor 19.

The signal output 21 of the microprocessor 19 is connected via the amplifier 20 either to the associated safety line section 16*a*, 16*b*, 16*c*, or to the diagnosis line 15 (FIG. 2).

Since, according to FIGS. 1 and 3, the safety path is open at this point when one of the break switches 12*a*, 12*b*, 12*c* is operated, the monitoring signal that is generated in the evaluation unit 11 is interrupted in this situation. It is thus impossible for any data collisions to occur between the monitoring (test) signal and the generator code sequence during the subsequent transmission of the characteristic code signal via sections of the safety path.

It is also feasible for the microprocessor 19 to emit the characteristic code signal continuously, in which case the make switches 17*a*, 17*b*, 17*c* would then have to be provided in the path between the signal output 21 and the connection point 14*b* of the amplifier 20. In this case, the make switch 17*a*, 17*b*, 17*c* is preferably provided at the output of the amplifier 20.

Low-cost small microprocessors, for example the PIC 12C508 (8-pin, 8-bit S08 cam) from Microchip, are available for the application according to the invention.

What is claimed is:

1. Safety switching arrangement comprising at least two break switches which are connected in series to an evaluation unit, in which case the evaluation unit initiates a safety signal when at least one of the break switches opens, and determines which of the break switches has opened, at least one of the break switches having an associated code signal generator which, when the associated break switch opens, supplies to the evaluation unit a code signal which is characteristic of the relevant break switch via a line which leads to the evaluation unit and is common to all break switches associated with a code signal generator, which code signal is analyzed in the evaluation unit and is identified as coming from the relevant break switch.

2. Safety switching arrangement according to claim 1 wherein each break switch has an associated make switch which is operated jointly with it and activates the associated code signal generator when it closes.

3. Safety switching arrangement according to claim 1 wherein the code signal output of each code signal generator is applied to an input of the associated break switch when the latter opens, and wherein the code signal emitted by the relevant code signal generator is passed via the line leading to the open break switch and via the closed break switch located upstream of it to the evaluation unit, and is evaluated there.

4. Safety switching arrangement according to claim 1 wherein the code signal output of each code signal generator is applied, when the associated break switch opens, to a special diagnosis line which is common to all the break switches and leads to the evaluation unit where the code signal emitted by the activated code signal generator is evaluated.

5. Safety switching arrangement according to claim 1 wherein the code signal generator produces the code signal by a mechanical movement of the break switch.

6. Safety switching arrangement according to claim 1 wherein each code signal generator is connected to the evaluation unit via a voltage supply line which is common to all code signal generators.

7. Safety switching arrangement according to claim 1 wherein each code signal generator has an ASICS or microprocessor for code signal production.

8. Safety switching arrangement according to claim 7 wherein a signal output of the microprocessor is connected via an amplifier to the line leading to the evaluation unit, or to line sections leading to the evaluation unit.

9. Safety switching arrangement according to claim 8 wherein make switches are provided in an activation line which leads to an activation input of the microprocessor and branches off from a voltage supply, or are provided in a signal output path of the microprocessor.

10. Safety switching arrangement according to claim 1 wherein the evaluation unit has test-in, test-out, voltage supply and diagnosis-in connections.

11. Safety switching arrangement according to claim 1 wherein all of the break switches have an associate code signal generator.

12. Safety switching arrangement according to claim 1 wherein the line comprises a diagnostic line.

13. Safety switching arrangement according to claim 1 wherein the line comprises a plurality of safety line sections.

14. Safety switching arrangement comprising at least two break switches at least one of which has an associated code signal generator for generating a code signal which is characteristic of the associated break switch, an evaluation unit, the break switches being connected in series to the evaluation unit, and a line leading to the evaluation unit and common to all break switches which have associated code signal generators for supplying the evaluation unit with the code signal which is characteristic of the associated break switch, the evaluation unit analyzing the code signal and determining the break switch with which the code signal is associated.

* * * * *